(12) United States Patent
Parekh et al.

(10) Patent No.: US 11,057,074 B2
(45) Date of Patent: Jul. 6, 2021

(54) DATA AND POWER COMMUNICATION CABLE WITH GALVANIC ISOLATION PROTECTION

(71) Applicant: Cosemi Technologies, Inc., Irvine, CA (US)

(72) Inventors: Devang Parekh, Castro Valley, CA (US); David Miller, San Francisco, CA (US)

(73) Assignee: COSEMI TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 16/515,478

(22) Filed: Jul. 18, 2019

(65) Prior Publication Data

US 2021/0021301 A1    Jan. 21, 2021

(51) Int. Cl.
     *H04B 10/12*    (2006.01)
     *H04B 3/32*    (2006.01)
     (Continued)

(52) U.S. Cl.
     CPC ............... *H04B 3/32* (2013.01); *H04B 3/50* (2013.01); *H04B 10/2589* (2020.05); *H04B 10/806* (2013.01)

(58) Field of Classification Search
     CPC .................................................... H04B 5/0037
     See application file for complete search history.

(56) References Cited

U.S. PATENT DOCUMENTS

| | | |
|---|---|---|
| 4,451,916 A | 5/1984 | Casper et al. |
| 5,966,387 A | 10/1999 | Cloutier |

(Continued)

FOREIGN PATENT DOCUMENTS

| | | |
|---|---|---|
| EP | 1978656 | 8/2008 |
| JP | 200955306 | 3/2009 |

(Continued)

OTHER PUBLICATIONS

SeaISo Ruggedized Single Port Inline USB Isolator Cable—Sealevel, downloaded Aug. 31, 2020, 4 pages https://www.sealevel.com/product/iso-1r-seaiso-single-port-ruggedized-inline-usb-isolator-cable-ul-recognized/.

(Continued)

*Primary Examiner* — David C Payne
*Assistant Examiner* — Pranesh K Barua
(74) *Attorney, Agent, or Firm* — Loza & Loza, LLP; George L. Fountain (57) ABSTRACT

A data and power communication cable that provides galvanic isolation between data-signal related circuitry and power-signal related circuitry present at both ends of the cable. The cable includes a first connector configured to mate with a first device to receive data and power signals therefrom; a first galvanic-isolating device configured to generate a galvanic-isolated data signal based on the data signal; a second galvanic-isolating device configured to generate a galvanic-isolated power signal based on the power signal; a second connector configured to mate with a second device to provide the galvanic-isolated data signal and the galvanic-isolated power signal thereto; a first set of communication mediums to route the data signal or the galvanic-isolated data signal from the first connector to the second connector; and a second set of communication mediums to route the power signal or the galvanic-isolated power signal from the first connector to the second connector.

21 Claims, 7 Drawing Sheets

(51) Int. Cl.
  *H04B 10/80* (2013.01)
  *H04B 3/50* (2006.01)
  *H04B 10/25* (2013.01)

(56) References Cited

U.S. PATENT DOCUMENTS

| | | | |
|---|---|---|---|
| 6,931,183 B2 | 8/2005 | Panak et al. | |
| 6,940,477 B2 | 9/2005 | Moon et al. | |
| 7,155,134 B2 | 12/2006 | Azadet | |
| 7,319,232 B1* | 1/2008 | Bell | H04B 10/6911 250/214 R |
| 7,551,852 B2 | 6/2009 | Reintjes et al. | |
| 7,602,739 B2 | 10/2009 | Weigert | |
| 7,706,692 B2 | 4/2010 | Tatum et al. | |
| 7,714,677 B2 | 5/2010 | Wang | |
| 7,734,183 B2 | 6/2010 | Whitehead | |
| 7,941,052 B2 | 5/2011 | Epitaux et al. | |
| 8,068,742 B2 | 11/2011 | Cole et al. | |
| 8,233,805 B2 | 7/2012 | Tatum et al. | |
| 8,251,594 B2 | 8/2012 | Lavoie et al. | |
| 8,804,792 B1 | 8/2014 | Cheung et al. | |
| 8,805,195 B2 | 8/2014 | Mateosky et al. | |
| 8,824,898 B2 | 9/2014 | Groepl et al. | |
| 8,831,436 B2 | 9/2014 | Evans et al. | |
| 8,935,740 B2 | 1/2015 | Suzuki et al. | |
| 8,948,197 B2 | 2/2015 | Jiang et al. | |
| 9,040,823 B2 | 5/2015 | Horan et al. | |
| 9,076,575 B2 | 7/2015 | Horan et al. | |
| 9,397,750 B2 | 7/2016 | Parekh et al. | |
| 9,397,751 B2 | 7/2016 | Parekh et al. | |
| 9,602,116 B1 | 3/2017 | Le et al. | |
| 9,813,153 B2 | 11/2017 | Parekh et al. | |
| 10,033,434 B1* | 7/2018 | Haynes | H04B 3/542 |
| 2002/0126967 A1 | 9/2002 | Panak et al. | |
| 2003/0132941 A1 | 7/2003 | Echizenya | |
| 2004/0056732 A1 | 3/2004 | Errington | |
| 2004/0070411 A1 | 4/2004 | Self et al. | |
| 2004/0184746 A1 | 9/2004 | Chang et al. | |
| 2006/0024067 A1 | 2/2006 | Koontz | |
| 2006/0221948 A1 | 10/2006 | Benner et al. | |
| 2006/0268167 A1 | 11/2006 | Cole et al. | |
| 2007/0014522 A1 | 1/2007 | Yamaguchi et al. | |
| 2007/0237463 A1 | 10/2007 | Aronson | |
| 2007/0237470 A1 | 10/2007 | Aronson et al. | |
| 2007/0286600 A1 | 12/2007 | Guo et al. | |
| 2008/0031629 A1 | 2/2008 | Nguyen et al. | |
| 2008/0107424 A1 | 5/2008 | Tonietto et al. | |
| 2009/0009662 A1 | 1/2009 | Manapragada et al. | |
| 2009/0092398 A1* | 4/2009 | Graber | H04B 10/801 398/116 |
| 2009/0260043 A1 | 10/2009 | Tatsuta et al. | |
| 2010/0150573 A1* | 6/2010 | Furuyama | G02B 6/4292 398/142 |
| 2010/0284323 A1 | 11/2010 | Tang et al. | |
| 2011/0091219 A1* | 4/2011 | Tatum | G02B 6/4246 398/142 |
| 2011/0111642 A1 | 5/2011 | Sloey et al. | |
| 2012/0249871 A1 | 10/2012 | Nguyen et al. | |
| 2013/0077640 A1* | 3/2013 | Jiang | G02B 6/4249 370/464 |
| 2013/0147520 A1 | 6/2013 | Payne | |
| 2013/0243437 A1 | 9/2013 | Kishima et al. | |
| 2014/0070907 A1* | 3/2014 | Boggan | H01P 3/081 333/24 R |
| 2014/0186023 A1* | 7/2014 | Louderback | H04B 10/071 398/16 |
| 2014/0346325 A1 | 11/2014 | Frank | |
| 2015/0010311 A1* | 1/2015 | Parekh | G02B 6/4293 398/116 |
| 2015/0110499 A1 | 4/2015 | Jiang et al. | |
| 2015/0256227 A1* | 9/2015 | Teggatz | H04B 5/0031 307/104 |
| 2015/0295647 A1* | 10/2015 | Parekh | G02B 6/3588 398/142 |
| 2016/0099651 A1* | 4/2016 | Ishigaki | H02M 3/33584 363/21.05 |
| 2016/0365795 A1* | 12/2016 | Madsen | H02M 3/158 |
| 2017/0054501 A9 | 2/2017 | Jiang et al. | |
| 2018/0101156 A1* | 4/2018 | Kumar Kn | H02H 9/008 |
| 2018/0170203 A1* | 6/2018 | Jang | B60L 11/1838 |
| 2018/0269990 A1* | 9/2018 | Muth | H04B 10/524 |
| 2018/0309443 A1* | 10/2018 | Calabrese | H03K 17/691 |
| 2018/0343763 A1* | 11/2018 | Kn | G05B 15/02 |
| 2019/0097736 A1* | 3/2019 | Ho | H01L 25/167 |

FOREIGN PATENT DOCUMENTS

| | | |
|---|---|---|
| JP | 201124179 | 12/2011 |
| WO | 2008119669 | 10/2008 |
| WO | 2012059071 | 10/2012 |

OTHER PUBLICATIONS

Acromag.com, downloaded Aug. 31, 2020, 3 pages, https://www.acromag.com/catalog/746/4-20ma-isolators-splitters/usb-isolators/usb-usb-isolators/compact-usb-isolators/usb.
http://www.ophit.com/products/product_view.asp?boardid=1&num=6&ptitle=DVI%20fiber%20optic%20cable%20:%20DDI
https://web.archive.org/web/20080611135155/http://www.ophit.com/html/main02-01-05.asp.
PCT/US12/57520. Int'l Search Report & Written Opinion (dated Feb. 1, 2013).
PCT/US12/57520. Int'l Prelim. Report of Patentability (dated Apr. 1, 2014).
PCT/US14/045310. Int'l, Search Report & Written Opinion (dated Nov. 5, 2014).
Chinese Patent Application No. 201480038089.9, First Office Action dated Oct. 28, 2016.
Japanese Office Action for Japanese Application No. 2016-524354 dated Mar. 28, 2018, 3 pages.

* cited by examiner

FIG. 6

DATA AND POWER COMMUNICATION CABLE WITH GALVANIC ISOLATION PROTECTION

BACKGROUND

Field

Aspects of the present disclosure relate generally to data and power communication cables, and in particular, to a data and power communication cable with galvanic isolation protection.

Background

Galvanic isolation refers to techniques in separating electrical circuits so that no stray current flow occurs between the circuits. Stray current occurs when there is a difference in ground potential associated with the separate electrical circuits, whereby the stray current may have been induced by ground loops. Galvanic isolation is useful in various applications, including electrical noise and surge immunity, personal safety in the presence of high voltage, floating ground for electrical power supplies, or measurements of electrical signals at differing potentials.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to a data and power communication cable including a first connector configured to mate with a corresponding connector of a first device, wherein the first connector is configured to receive a data signal and a power signal from the first device; a first galvanic-isolating device configured to generate a galvanic-isolated data signal based on the data signal; a second galvanic-isolating device configured to generate a galvanic-isolated power signal based on the power signal; a second connector configured to mate with a corresponding connector of a second device, wherein the second connector is configured to provide the galvanic-isolated data signal and the galvanic-isolated power signal to the second device; a first set of one or more communication mediums configured to route the data signal or the galvanic-isolated data signal from the first connector to the second connector; and a second set of one or more communication mediums configured to route the power signal or the galvanic-isolated power signal from the first connector to the second connector.

Another aspect of the disclosure relates to a data and power communication cable including a first connector configured to mate with a corresponding connector of a first device, wherein the first connector is configured to receive a data signal and a first power signal from the first device; a galvanic-isolating device configured to generate a galvanic-isolated data signal based on the data signal; a second connector configured to mate with a corresponding connector of a second device, wherein the second connector is configured to provide the galvanic-isolated data signal to the second device and receive a second power signal from the second device; and a set of one or more communication mediums configured to route the data signal or the galvanic-isolated data signal from the first connector to the second connector.

Another aspect of the disclosure relates to a data and power communication cable including a first connector configured to mate with a corresponding connector of a first device, wherein the first connector is configured to receive a data signal and a power signal from the first device; a galvanic-isolating device configured to generate a galvanic-isolated power signal based on the power signal; a second connector configured to mate with a corresponding connector of a second device, wherein the second connector is configured to provide the data signal and the galvanic-isolated power signal to the second device; a first set of one or more communication mediums configured to route the data signal from the first connector to the second connector; and a second set of one or more communication mediums configured to route the power signal or the galvanic-isolated power signal from the first connector to the second connector.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
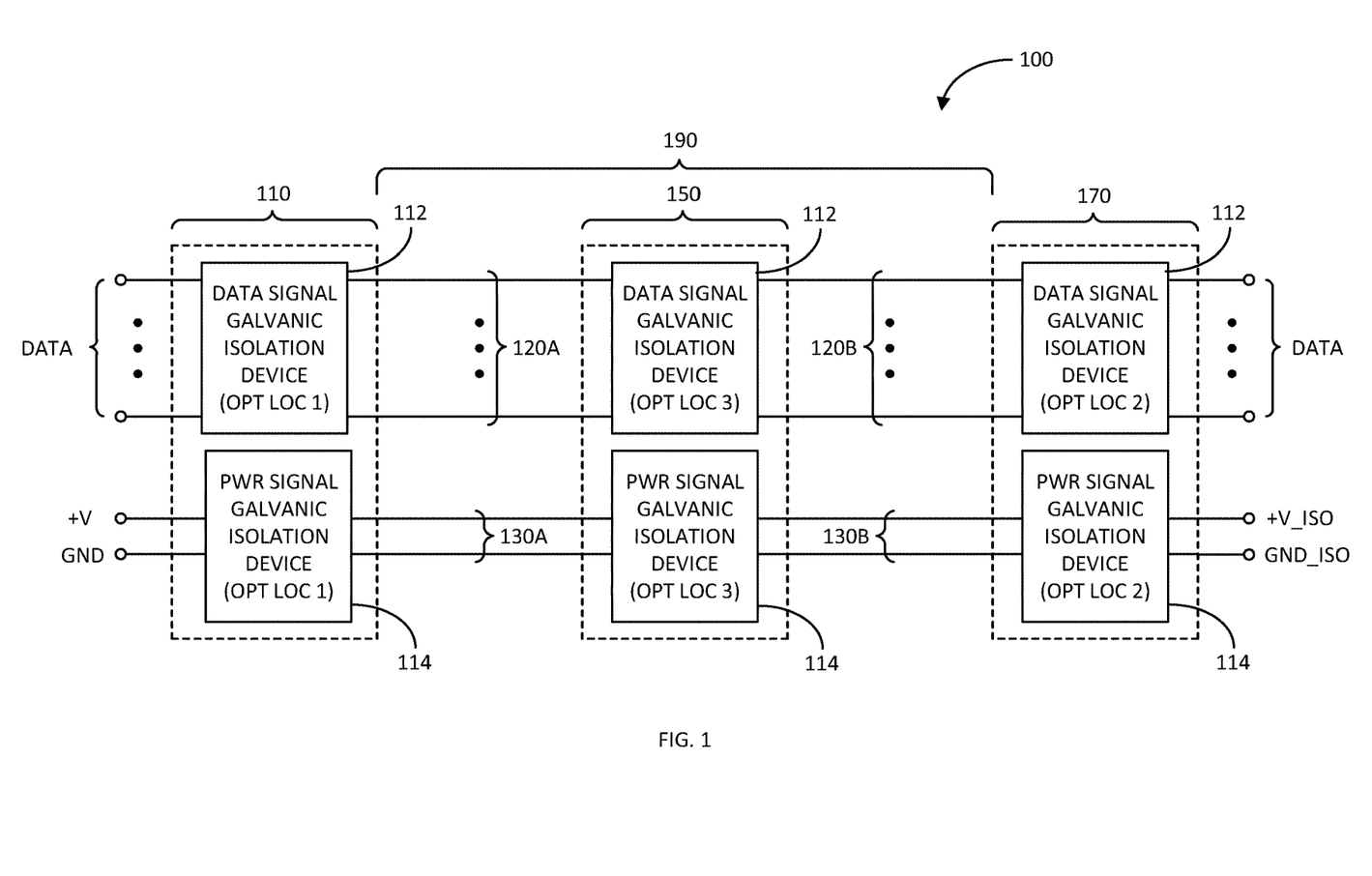
FIG. 1 illustrates a block/schematic diagram of an exemplary data and power communication cable with galvanic isolation protection in accordance with an aspect of the disclosure.

FIG. 1 illustrates a block/schematic diagram of an exemplary data and power communication cable 100 with galvanic isolation protection in accordance with an aspect of the disclosure. The communication cable 100 includes a first connector 110, a set of communication mediums 190, and a second connector 170.

The first connector 110 is configured to mate with a connector of a first device (not shown). The first connector 110 provides and/or receives a data signal to and/or from the first device. For example, if the data signal is being transmitted in a unidirectional manner, the first connector 110 either provides or receives the data signal to or from the first device. If the data signal is being transmitted in a bidirectional manner, the first connector 110 provides and receives the data signal to and from the first device. The first connector 110 is also receives a power signal (e.g., +V and GND) from the first device.

Similarly, the second connector 170 is configured to mate with a connector of a second device (not shown). The second connector 170 receives and/or provides data signal from and/or to the second device. For example, if the data signal is being transmitted in a unidirectional manner, the second connector 170 either receives or provides the data signal from or to the second device. If the data signal is being transmitted in a bidirectional manner, the second connector 170 receives and provides the data signal to and from the second device. The second connector 170 also provides galvanic-protected power signal (e.g., +V_ISO and GND_ISO) to the second device.

The set of communication mediums 190 includes opposite ends mechanically coupled to the first and second connectors 110 and 170, respectively. The set of communication mediums 190 includes a first subset of communications mediums 120A and/or 120B for routing the data signal between the first and second connectors 110 and 170. If the data signal is of relatively high bitrate, such as bitrates on the order of multimedia data (e.g., video and/or audio), which may comply with various standards, such as Universal Serial Bus (USB), High-Definition Multimedia Interface (HDMI), DisplayPort, Digital Visual Interface (DVI), to name a few, the first subset of communications mediums 120A and/or 120B may be one or more optical fibers.

If the data signal is of relatively low bitrate, such as bitrates on the order of control signaling, such as Consumer Electronics Control (CEC), Serial Clock Line (SCL), Serial Data Line (SDA), and Hot Plug Detect (HPF) used in HDMI, or auxiliary channel and HPD used in DisplayPort, or display data channel (DDC) data and clock used in Digital Visual Interface (DVI), to name a few, the first subset of communications mediums 120A and/or 120B may be one or more electrical wires.

Similarly, the set of communication mediums 190 includes a second subset of communication mediums 130A and/or 130B for routing the power signal (e.g., +V and GND) from the first connector 110 to the second connector 170. Since the power signal are in essence constant direct current (DC) signal, the second subset of communication mediums 130A and/or 130B are electrical wires.

As previously discussed herein, there may be a need to galvanically isolate the electrical circuits situated in the first device connected to the first connector 110 from the electrical circuits situated in the second device connected to the second connector 170. To this end, the data and power communication cable 100 includes galvanic isolation devices. The form of the galvanic isolation device depends on whether galvanic isolation is provided to the electrical circuits for the transmission and reception of data signal or the transmission and reception of the power signal. Additionally, the galvanic isolation devices may be located anywhere on the communication cable 100 as exemplified in more detail below.

In particular, the data and power communication cable 100 may include a data signal galvanic isolation device 112 and a power signal galvanic isolation device 114 located within the housing of the first connector 110. The data signal galvanic isolation device 112 provides galvanic isolation between the data signal related circuits in the first and second devices connected to the first and second connectors 110 and 170, respectively. Similarly, the power signal galvanic isolation device 114 provides galvanic isolation between the power signal related electrical circuits in the first and second devices connected to the first and second connectors 110 and 170, respectively.

The data signal galvanic isolation device 112 may take on different forms. For example, if the data signal is of relatively high bitrate, as previously mentioned, the galvanic isolation device 112 may be an electrical-to-optical converter and/or optical-to-electrical converter. As an example, if the data signal is being transmitted from the first device to the second device, the galvanic isolation device 112 receives the electrical data signal and converts it to an optical data signal for transmission to the second connector 170 via the one or more optical fibers 120A. If the data signal is being transmitted from the second device to the first device, the galvanic isolation device 112 receives the optical data signal from the second connector 170 via the one or more optical fibers 120A and converts it to an electrical data signal for providing it to the first device.

As the transmission of the data signal between the first and second connectors 110 and 170 is in the optical domain, there is no electrical current flow between the first and second devices via the galvanic isolation device; thereby, providing galvanic isolation between the data related electrical circuits within the first and second devices, respectively.

If the data signal is of relatively low bitrate, as previously mentioned, the galvanic isolation device 112 may employ other forms of galvanic isolation. For example, the galvanic isolation device 112 may be configured as an optocoupler or opto-isolator, where the electrical data signal is converted into an optical data signal, and then re-converted back to an electrical data signal. As another example, the galvanic isolation device may be configured as a DC blocking capacitor allowing higher-frequency current associated with the bitrate of the data signal to pass through, while blocking DC or very low frequency stray currents due to, for example, potential difference or ground loops. Other configurations for the galvanic isolation device 112 include magnetic flux isolation transformer, Hall effect sensor, and others.

The power signal galvanic isolation device 114 may be configured as a DC-to-DC converter, such as a magnetic- or transformer-type DC-to-DC converter, capacitive-type DC-to-DC converter, and others. For example, in transformer-type DC-to-DC converter, the input power signal (e.g., +V and GND) are initially converted into an input AC signal, the input AC signal is applied across a primary winding of a transformer, the magnetic coupling of the primary and secondary windings produce an output AC signal across the secondary winding, and a rectifier converts the output AC signal back to an output power signal (e.g., +V_ISO and GND_ISO). The transformer provides the galvanic isolation between the input and the output of the DC-to-DC converter.

In capacitive-type DC-to-DC converter, a charge pump charges a shunt capacitor based on the input power signal (e.g., +V and GND), the shunt capacitor is rearranged to be connected in series between the input and the output, the rearrangement produces an output power signal (e.g., +V_ISO and GND_ISO). The capacitor provides the galvanic isolation between the input and the output of the DC-to-DC converter.

The data and power signal galvanic isolation devices 112 and 114 may be situated anywhere within the communication cable 100. For example, the galvanic isolation devices 112 and 114 may be situated in the first connector 110 (optional location 1). They may also be situated in the second connector 170 (optional location 2). Or, the communication cable 100 may further include an intermediate housing 150 where the galvanic isolation devices 112 and 114 may be located (optional location 3). In this alternative implementation, the data signal isolation device 112 may receive the data signal via communication medium 120A or 120B, and produce the galvanic isolated data signal for transmission via the communication medium 120B or 120A, respectively. Similarly, the power signal isolation device 114 may receive the power signal (e.g., +V and GND) via communication medium 130A, and produce the galvanic isolated power signal (e.g., +V_ISO and GND_ISO) for transmission via the communication medium 130B. Further, it shall be understood that the data signal galvanic isolation device 112 need not be co-located with the power signal galvanic isolation device 114.

In the case of the data signal galvanic isolation device 112 including an electrical-to-optical converter, as in the case where the data signal may have a relatively high bitrate as previously discussed, it may be preferred that the electrical-to-optical converter 112 is in close proximity to the source of the data signal. For example, if the source of the high bitrate data signal is the first device, it may be preferred that the electrical-to-optical converter 112 is located within the housing of the first connector 110. Similarly, if the source of the high bitrate data signal is the second device, it may be preferred that the electrical-to-optical converter 112 is located within the housing of the second connector 170. In this way, the transmission of the optical signal is along the one or more optical fibers 120A between the first connector 110 and the second connector 170.

The corollary to the above is that the corresponding optical-to-electrical converter of the data signal galvanic isolation device 112 may preferably be located near the sink of the data signal. For example, if the source of the high bitrate data signal is the first device, it may be preferred that the optical-to-electrical converter 112 is located within the housing of the second connector 170. Similarly, if the source of the high bitrate data signal is the second device, it may be preferred that the optical-to-electrical converter 112 is located within the housing of the first connector 110.

Figure 2:
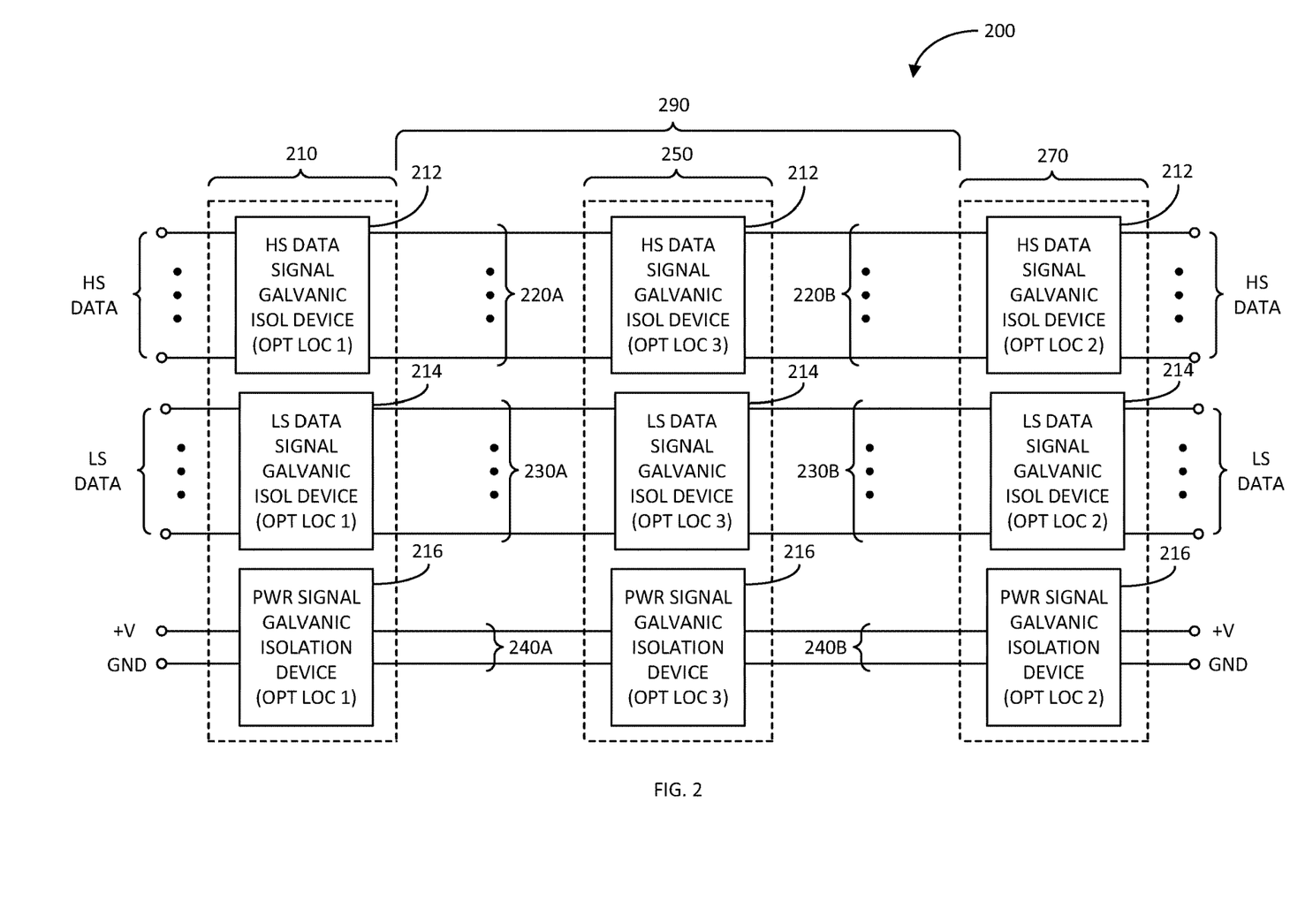
FIG. 2 illustrates a block/schematic diagram of another exemplary data and power communication cable with galvanic isolation protection in accordance with another aspect of the disclosure.

FIG. 2 illustrates a block/schematic diagram of another exemplary data and power communication cable 200 with galvanic isolation protection in accordance with another aspect of the disclosure. The data and power communication cable 200 is similar to that of data and power communication cable 100, but instead includes two types of data signal; a high-speed (HS) data signal and a low-speed (LS) data signal, and associated galvanic isolation devices, as discussed further below. By high-speed (HS) versus low-speed (LS) means that the HS data signal has a bitrate higher than the bitrate of the LS data signal.

The data and power communication cable 200 includes a first connector 210, a second connector 270, and a set of communication mediums 290 with opposite ends mechanically coupled to the first and second connectors 210 and 270, respectively. The first connector 210 is configured to connect to a first device (not shown), which, in this example, serves a source of power signals (e.g., +V and GND). The first device may also serve as a source of HS data signal, and as a source and sink of LS data signal. The second connector 270 is configured to connect to a second device (not shown), which, in this example, serves as a sink of galvanic isolated power signals (e.g., +V_ISO and GND_ISO). The second device may also serve as a sink of HS data signal, and as a sink and source of LS data signal.

The communication cable 200 includes an HS data signal galvanic isolation device 212, an LS data signal galvanic isolation device 214, and a power signal galvanic isolation device 216. The HS data signal isolation device 212 galvanically isolates the HS data signal related electronic circuits in the first and second devices from each other. The LS data signal isolation device 214 galvanically isolates the LS data signal related electronic circuits in the first and second devices from each other. And, the power data signal isolation device 216 galvanically isolates the power signal related electronic circuits in the first and second devices from each other.

As discussed with reference to data and power communication cable 100, the HS data signal isolation device 212 may be configured as an electrical-to-optical converter for receiving the electrical HS data signal from one of the first or second device and converting it to an optical signal, and an optical-to-electrical converter for converting the optical signal back into an electrical HS data signal. In this case, the optical signal is transmitted via one or more optical fibers between the first and second connectors 210 and 270.

Also, as discussed with reference to data and power communication cable 100, the LS data signal isolation device 214 may be configured as an optocoupler or opto-isolator, DC blocking capacitor, magnetic flux isolation transformer, or Hall effect sensor. The power signal isolation device 216 may be configured as a DC-to-DC converter, such as a transformer-type DC-to-DC converter or capacitive-type DC-to-DC converter.

The HS and LS data and power signal galvanic isolation devices 212, 214, and 216 may be situated anywhere within the communication cable 200. For example, the galvanic isolation devices 212, 214, and 216 may be situated in the first connector 210 (optional location 1). They may also be situated in the second connector 270 (optional location 2). Or, the communication cable 200 may further include an intermediate housing 250, where the galvanic isolation devices 212, 214, and 216 may be located (optional location 3). In this alternative implementation, the HS and LS data signal isolation devices 212 and 214 may receive the HS and LS data signal via communication mediums 220A/230A or 220B/230B, and produce the galvanic isolated HS and LS data signal for transmission via the communication medium 220B/230B or 220A/230A, respectively. Similarly, the power signal isolation device 216 may receive the power signal (e.g., +V and GND) via communication medium 240A, and produce the galvanic isolated power signal (e.g., +V_ISO and GND_ISO) for transmission via the communication medium 240B. Further, it shall be understood that the galvanic isolation devices 212, 214, and 216 need not be co-located within the same region of the communication cable 200.

In the case of the HS data signal galvanic isolation device 212 including an electrical-to-optical and optical-to-electrical converters, it is preferred that the electrical-to-optical converter is in close proximity to the source of the HS data signal. For example, if the source of the HS data signal is the first device, it may be preferred that the electrical-to-optical converter is located within the housing of the first connector 210. Similarly, if the source of the HS data signal is the second device, it may be preferred that the electrical-to-optical converter is located within the housing of the second connector 270. In this way, the transmission of the optical signal is along the one or more optical fibers between the first connector 210 and the second connector 270.

The corollary to the above is that the corresponding optical-to-electrical converter of the HS data signal galvanic isolation device 212 may preferably be located near the sink of the data signal. For example, if the source of the HS data signal is the first device, it may be preferred that the optical-to-electrical converter is located within the housing of the second connector 270. Similarly, if the source of the HS data signal is the second device, it may be preferred that the optical-to-electrical converter is located within the housing of the first connector 210.

Figure 3:
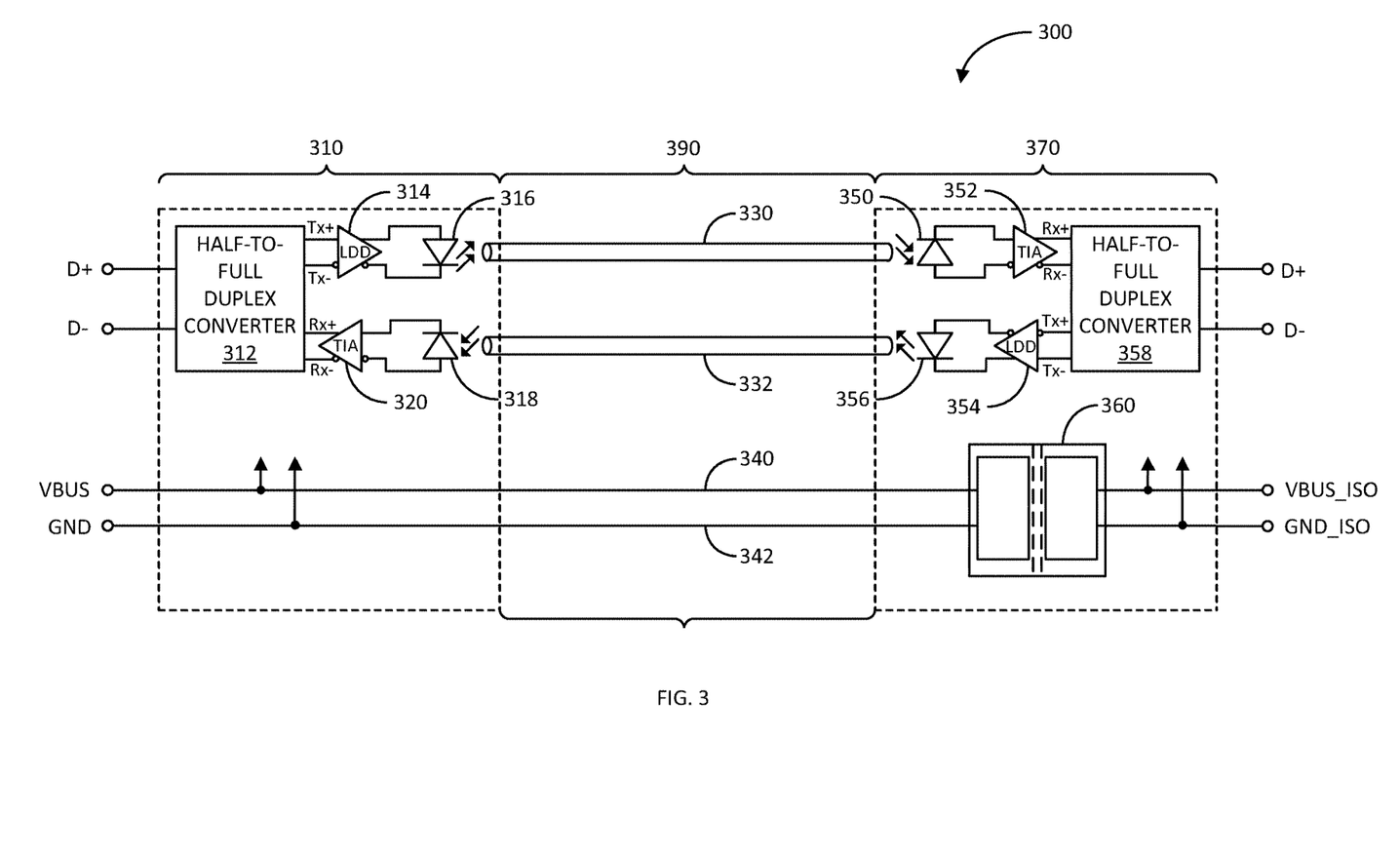
FIG. 3 illustrates a block/schematic diagram of another exemplary data and power communication cable with galvanic isolation protection in accordance with another aspect of the disclosure.

FIG. 3 illustrates a block/schematic diagram of another exemplary data and power communication cable 300 with galvanic isolation protection in accordance with another aspect of the disclosure. The data and power communication cable 300 may be an exemplary more detailed implementation of the data and power communication cable 100 previously discussed. As an example, the data and power communication cable 300 may be configured as a USB cable with galvanic isolation protection for the data-side and power-side of the cable.

The data and power communication cable 300 includes a first connector 310, a second connector 370, and a set of communication mediums 390 with opposite ends mechanically coupled to the first and second connectors 310 and 370, respectively. The first connector 310 is configured to mate with a connector of a first device (not shown). Since a USB cable is bidirectional in the transfer of data, the first connector 310 is configured to receive and provide a data signal (D+/D−) from and to the first device. Further, in this example, the first device serves as the source of power signal (VBUS and GND). Thus, the first connector 310 is configured to receive the power signal (VBUS and GND) from the first device.

The second connector 370 is configured to mate with a connector of a second device (not shown). Since, as discussed, a USB cable is bidirectional in the transfer of data, the second connector 370 is configured to provide and receive the data signal (D+/D−) to and from the second device. Further, in this example, the second device serves as a sink of galvanic-isolated power signal (VBUS_ISO and GND_ISO). Thus, the second connector 370 is configured to provide the galvanic-isolated power signal (VBUS_ISO and GND_ISO) to the second device.

For providing galvanic isolation for the data-related electronic circuits in the first and second devices, the first connector 310 includes a half-to-full duplex converter 312, a laser diode driver (LDD) 314, a vertical cavity surface emitting laser (VCSEL) 316, a photo detector 318, and a transimpedance amplifier (TIA) 320. The half-to-full duplex converter 312 allows the bidirectional data signals (D+/D−) to be received from and sent to the first device in a half-duplex (not simultaneously, e.g., in a time-multiplexed manner) or full-duplex (simultaneously) manner.

The half-to-full duplex converter 312 provides the electrical data signal received from the first device to the LDD 314. The LDD 314 and VCSEL 316 operate as an electrical-to-optical converter. That is, the LDD 314 boosts the electrical data signal sufficient to drive the VCSEL 316. The VCSEL 316 generates an optical signal based on the drive signal from the LDD 314. The optical signal is transmitted from the first connector 310 to the second connector 370 via an optical fiber 330 as part of the set of communication mediums 390.

The photo detector 318 receives an optical signal from the second connector 370 via another optical fiber 332 as part of the set of communication mediums 390. The photo detector 318 and TIA 320 operate as an optical-to-electrical converter. That is, the photo detector 318 converts the optical data signal into an electrical current data signal. The TIA 320 converts the electrical current data signal into an electrical voltage data signal. As previously discussed, the half-to-full duplex converter 312 provides the electrical voltage data signal to the first device in a half-duplex or full-duplex manner.

The second connector 370 includes a half-to-full duplex converter 358, a photo detector 350, a transimpedance amplifier (TIA) 352, a laser diode driver (LDD) 354, and a vertical cavity surface emitting laser (VCSEL) 356. Similarly, the half-to-full duplex converter 358 allows the bidirectional data signals (D+/D−) to be sent to and received from the second device in a half-duplex or full-duplex manner.

The photo detector 350 receives the optical data signal from the first connector 310 via the optical fiber 330. The photo detector 350 and TIA 352 operate as an optical-to-electrical converter. That is, the photo detector 350 converts the optical data signal into an electrical current data signal. The TIA 352 converts the electrical current data signal into an electrical voltage data signal. As previously discussed, the half-to-full duplex converter 358 provides the electrical voltage data signal to the second device in a half-duplex or full-duplex manner.

The half-to-full duplex converter 358 provides the electrical data signal received from the second device to the LDD 354. The LDD 354 and VCSEL 356 operate as an electrical-to-optical converter. That is, the LDD 354 boosts the electrical data signal sufficient to drive the VCSEL 356. The VCSEL 356 generates the optical data signal based on the drive signal from the LDD 354. The optical data signal is transmitted from the second connector 370 to the first connector 310 via the optical fiber 332.

As the transmission of the data signal (D+/D−) between the first and second devices occurs in the optical domain along the communication cable 300, galvanic isolation between the data-related circuits in the first and second devices is achieved.

With regard to power signal, the first connector 310 is configured to receive the power signal (VBUS/GND) from the first device. As indicated by the arrows, the power signal VBUS/GND provides power to the electrical circuits/devices within the first connector 310, such as, for example, the LDD 314 and/or the TIA 320. The power signal VBUS and GND are coupled to wire mediums 340 and 342 of the set of communication mediums 390 for transmission from the first connector 310 to the second connector 370, respectively. The second connector 370 includes a DC-to-DC converter 360 configured to receive the power signals VBUS and GND via the wired mediums 340 and 342, and generate galvanically-isolated power signals VBUS_ISO and GND_ISO, respectively. As indicated by the arrows, the power signals VBUS_ISO/GND_ISO provides power to the electrical circuits/devices within the second connector 370, such as, for example, the TIA 352 and/or the LDD 354. The second connector 370 provides the galvanically-isolated power signals VBUS_ISO and GND_ISO to the second device.

Thus, through the use of the DC-to-DC converter 360, galvanic isolation between the power-signal related circuits in the first and second devices is achieved. Although, in this example, the DC-to-DC converter 360 is situated in the second converter 370, it shall be understood that the DC-to-DC converter 360 may be situated within the first connector 310 or elsewhere along the communication cable 300.

Figure 4:
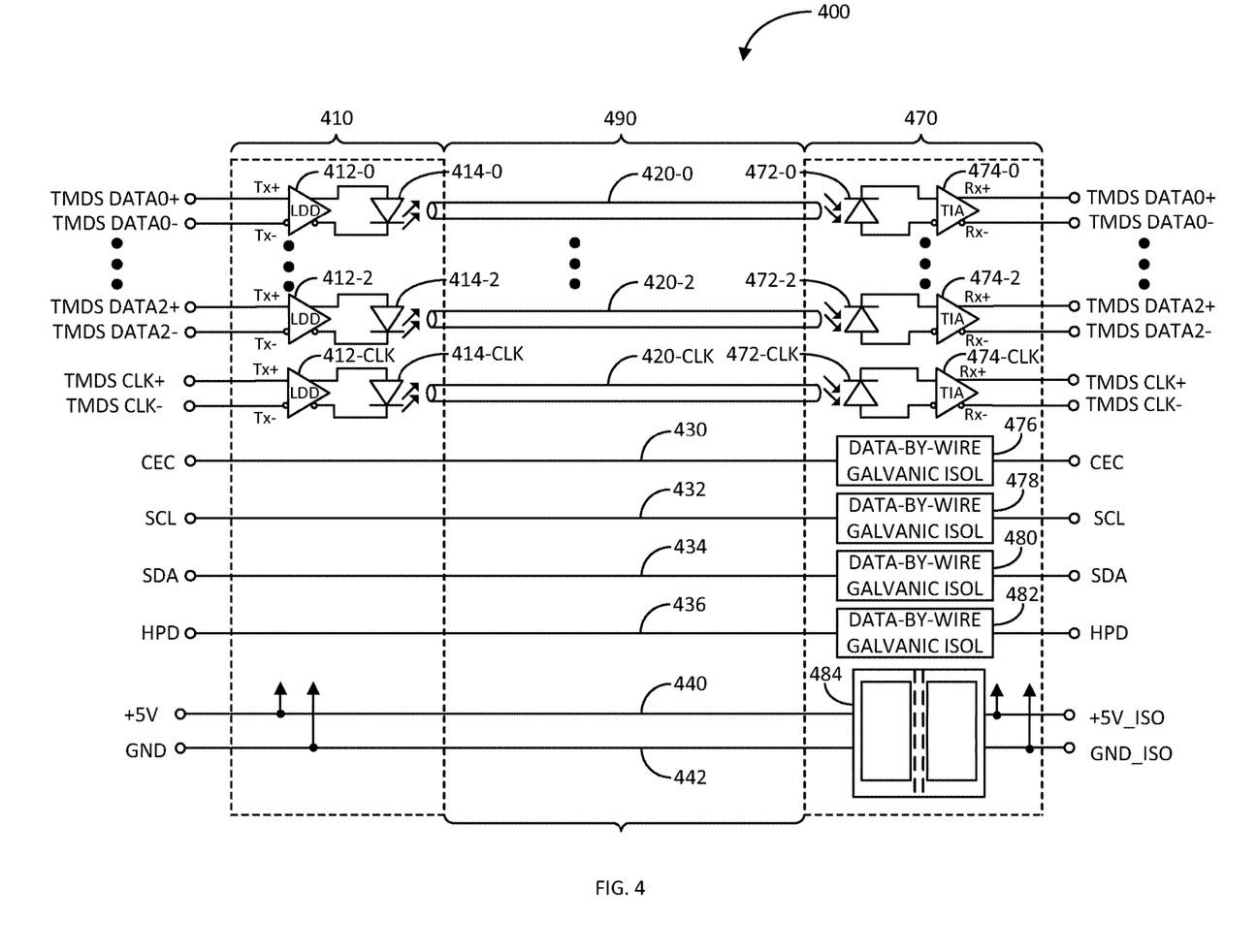
FIG. 4 illustrates a block/schematic diagram of another exemplary data and power communication cable with galvanic isolation protection in accordance with another aspect of the disclosure.

FIG. 4 illustrates a block/schematic diagram of another exemplary data and power communication cable 400 with galvanic isolation protection in accordance with another aspect of the disclosure. The data and power communication cable 400 may be an exemplary more detailed implementation of the data and power communication cable 200 previously discussed. As an example, the data and power communication cable 400 may be configured as an HDMI-compliant cable with galvanic isolation protection for the data-side and power-side of the cable.

The data and power communication cable 400 includes a first connector 410, a second connector 470, and a set of communication mediums 490 with opposite ends mechanically coupled to the first and second connectors 410 and 470, respectively. The first connector 410 is configured to mate with a connector of a first device (not shown). In this example, the first connector 410 of the HDMI-compliant communication cable 400 is coupled to the source of high-speed (multimedia) data signal (i.e., the first device). In this regard, the first connector 410 is configured to receive transmission-minimized differential signaling (TDMS) Data 0+/0− to TDMS Data 2+/2− and TDMS CLK+/CLK− from first device.

The first connector 410 is also configured to send and receive low-speed control data signal to and from the first device. For HDMI-application, these control data signal include the CEC, SCL, SDA, and HPD. Additionally, the first connector 410 is configured to receive power signals (+5V and GND) from the first device.

For providing galvanic isolation for the high-speed data-related electronic circuits in the first and second devices (among other reasons), the first connector 410 includes an electrical-to-optical converter comprising a set of laser diode drivers (LDDs) 412-0 to 412-2 and 412-CLK, and a set of vertical cavity surface emitting lasers (VCSELs) 414-0 to 414-2 and 414-CLK. The LDDs 412-0 to 412-2 and 412-CLK boosts the electrical TDMS data signals 0+/0− to 2+/2− and CLK+/CLK− with sufficient power to drive the set of VCSELs 414-0 to 414-2 and 414-CLK, respectively. The set of VCSELs 414-0 to 414-2 and 414-CLK generates optical data signals based on the drive signals from the LDDs 412-0 to 412-2 and 412-CLK, respectively. The optical data signals are transmitted from the first connector 410 to the second connector 470 via a set of optical fibers 420-0 to 420-2 and 420-CLK as part of the set of communication mediums 490. It shall be understood that the first connector 410 may include a multiplexer to reduce the number of optical fibers to one or more.

The second connector 470 is configured to mate with a connector of a second device (not shown). In this example, the second connector 470 of the HDMI-compliant communication cable 400 is coupled to the sink of the high-speed (multimedia) data signal (i.e., the second device). In this regard, the second connector 470 is configured to provide the transmission-minimized differential signaling (TDMS) Data 0+/0− to TDMS Data 2+/2− and TDMS CLK+/CLK− to the second device.

The second connector 470 is also configured to send and receive the low-speed control data signals to and from the second device. As discussed, for HDMI-application, these control data signals include the CEC, SCL, SDA, and HPD. Additionally, the second connector 470 is configured to send galvanically-isolated power signals (+5V_ISO and GND_ISO) to the second device.

For providing galvanic isolation for the high-speed data-related electronic circuits in the first and second devices (among other reasons), the second connector 470 includes an optical-to-electrical converter comprising a set of photo detectors (PDs) 472-0 to 472-2 and 472-CLK, and a set of transimpedance amplifiers (TIAs) 474-0 to 474-2 and 474-CLK. The set of photo detectors (PDs) 472-0 to 472-2 and 472-CLK receive the optical data signal from the first connector 410 via the optical fibers 420-0 to 420-2 and 420-CLK, respectively. The photo detectors (PDs) 472-0 to 472-2 and 472-CLK convert the optical data signals into corresponding electrical current data signals. The set of TIAs 474-0 to 474-2 and 474-CLK convert the electrical current data signals into electrical voltage data signals, which may be the transmission-minimized differential signaling (TDMS) Data 0+/0− to TDMS Data 2+/2− and TDMS CLK+/CLK−. The second connector 470 provides the transmission-minimized differential signaling (TDMS) Data 0+/0− to TDMS Data 2+/2− and TDMS CLK+/CLK− to the second device. It shall be understood that the second connector 470 may include a corresponding demultiplexer to reduce the number of optical fibers, as previously discussed.

As the transmission of the TDMS data signals between the first and second devices occurs in the optical domain along the communication cable 400, galvanic isolation between the high-speed data-related circuits in the first and second devices is achieved.

With regard to low-speed control signals (CEC, SCL, SDA, and HPD), the second connector 470 includes data-by-wire galvanic isolation devices 476, 478, 480, and 482. Each of the galvanic isolation devices 476, 478, 480, and 482 may be configured as an optocoupler or opto-isolator, DC blocking capacitor, magnetic flux isolation transformer, or Hall effect sensor. The galvanic isolation devices 476, 478, 480, and 482 receive the CEC, SCL, SDA, and HPD via the wired mediums 430, 432, 434, and 436 or from the second device, and provides the galvanically-isolated CEC, SCL, SDA, and HPD signals to the second device or to the first device via the wired mediums 430, 432, 434, and 436, respectively. The wired mediums 430, 432, 434, and 436 are part of the set of communication mediums 490.

Thus, through the use of the galvanic isolation devices 476, 478, 480, and 482, galvanic isolation between the low-speed control data signal related circuits in the first and second devices is achieved. Although, in this example, the galvanic isolation devices 476, 478, 480, and 482 are situated in the second converter 470, it shall be understood that the galvanic isolation devices 476, 478, 480, and 482 may be situated within the first connector 410 or elsewhere along the communication cable 400. It shall be further understood that the galvanic isolation devices 476, 478, 480, and 482 need not be co-located within the same housing of the communication cable 400.

With regard to power signal, the first connector 410 is configured to receive the power signal (+5V/GND) from the first device. As indicated by the arrows, the power signal +5V/GND provides power to the electrical circuits/devices within the first connector 410, such as, for example, the LDDs 412-0 to 412-2 and 412-CLK. The power signal +5V and GND are coupled to wire mediums 440 and 442 of the set of communication mediums 490 for transmission from the first connector 410 to the second connector 470, respectively. The second connector 470 includes a DC-to-DC converter 484 configured to receive the power signals +5V and GND via the wired mediums 440 and 442, and generate galvanically-isolated power signals +5V_ISO and GND_ISO, respectively. As indicated by the arrows, the galvanically-isolated power signal +5V_ISO/GND_ISO provides power to the electrical circuits/devices within the second connector 470, such as, for example, the TIAs 474-0 to 474-2 and 474-CLK. The second connector 470 provides the galvanically-isolated power signals +5V_ISO and GND_ISO to the second device.

Thus, through the use of the DC-to-DC converter 484, galvanic isolation between the power-signal related circuits in the first and second devices is achieved. Although, in this example, the DC-to-DC converter 484 is situated in the second converter 470, it shall be understood that the DC-to-DC converter 470 may be situated within the first connector 410 or elsewhere along the communication cable 400.

Figure 5A:
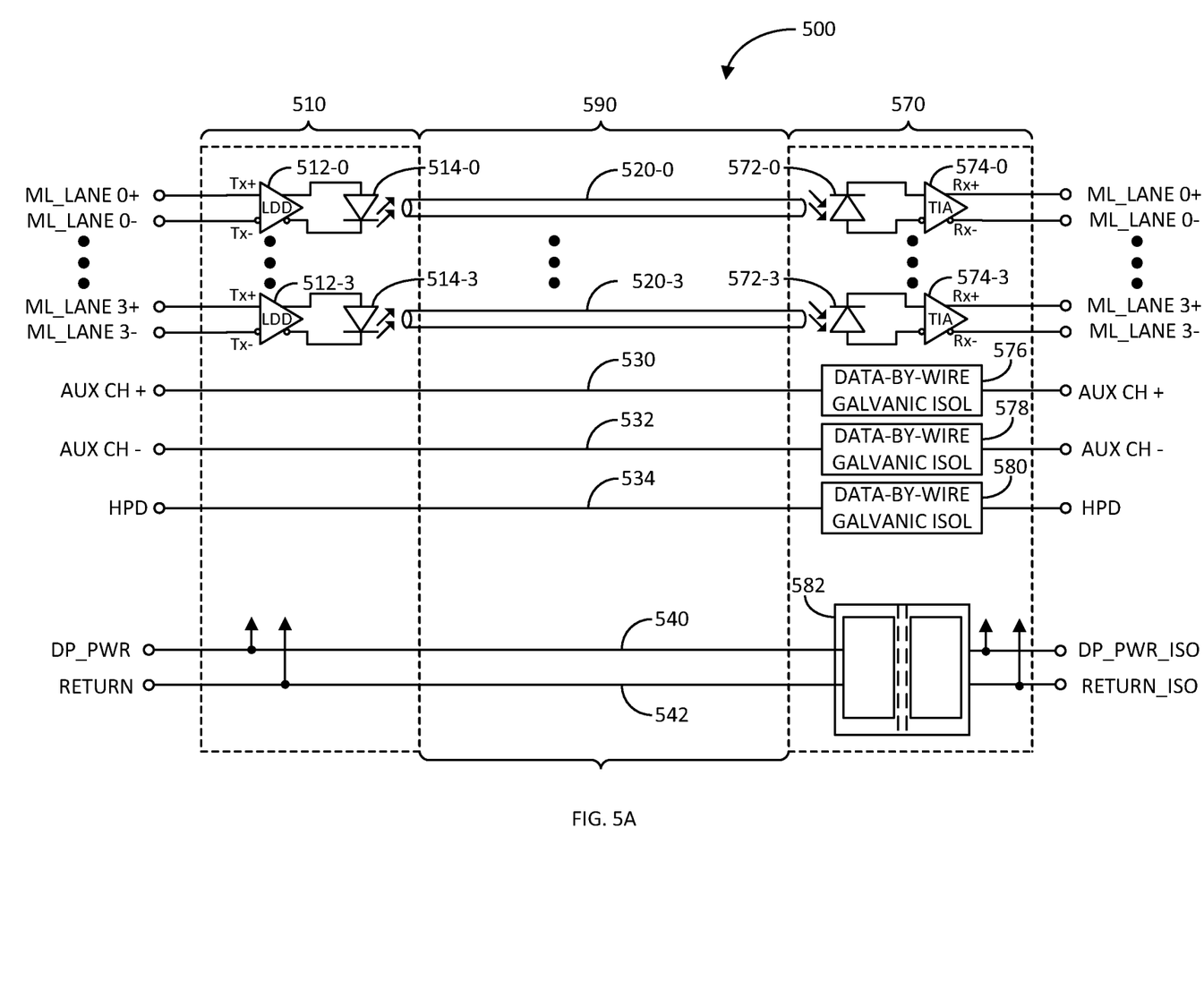
FIG. 5A illustrates a block/schematic diagram of another exemplary data and power communication cable with galvanic isolation protection in accordance with another aspect of the disclosure.

FIG. 5A illustrates a block/schematic diagram of another exemplary data and power communication cable 500 with galvanic isolation protection in accordance with another aspect of the disclosure. The data and power communication cable 500 may be an exemplary more detailed implementation of the data and power communication cable 200 previously discussed. As an example, the data and power communication cable 500 may be configured as a DisplayPort-compliant cable with galvanic isolation protection for the data-side and power-side of the cable. In this example, the communication cable 500 is a version that receives a power signal from only the high-speed data source.

In particular, the data and power communication cable 500 includes a first connector 510, a second connector 570, and a set of communication mediums 590 with opposite ends mechanically coupled to the first and second connectors 510 and 570, respectively. The first connector 510 is configured to mate with a connector of a first device (not shown). In this example, the first connector 510 of the DisplayPort-compliant communication cable 500 is coupled to the source of high-speed (multimedia) data signal (i.e., the first device). In this regard, the first connector 510 is configured to receive high-speed (multimedia) electrical data signals ML_LANE 0+/0− to ML_LANE 3+/3− from first device.

The first connector 510 is also configured to send and receive low-speed control data signals to and from the first device. For DisplayPort-application, these control data signals include the auxiliary channel AUX CH+/CH−, and the hot plug detect (HPD). Additionally, the first connector 510 is configured to receive power signals (DP_PWR and RETURN) from the first device.

For providing galvanic isolation for the high-speed data-related electronic circuits in the first and second devices (among other reasons), the first connector 510 includes an electrical-to-optical converter comprising a set of laser diode drivers (LDDs) 512-0 to 512-3, and a set of vertical cavity surface emitting lasers (VCSELs) 514-0 to 514-3. The LDDs 512-0 to 512-3 boost the electrical data signals ML_LANE0+/0− to ML_LANE3+/3− with sufficient power to drive the set of VCSELs 514-0 to 514-3, respectively. The set of VCSELs 514-0 to 514-3 generates optical data signals based on the drive signals from the LDDs 512-0 to 512-3, respectively. The optical data signals are transmitted from the first connector 510 to the second connector 570 via a set of optical fibers 520-0 to 520-3 as part of the set of communication mediums 590. It shall be understood that the first connector 510 may include a multiplexer to reduce the number of optical fibers to one or more.

The second connector 570 is configured to mate with a connector of a second device (not shown). In this example, the second connector 570 of the DisplayPort-compliant communication cable 500 is configured to be coupled with the sink of the high-speed (multimedia) data signal (i.e., the second device). In this regard, the second connector 570 is configured to provide the high-speed electrical data signals ML_LANE 0+/0− to ML_LANE 3+/3− to the second device.

The second connector 570 is also configured to send and receive the low-speed control data signals to and from the second device. As discussed, for DisplayPort-application, these control data signals include the AUX CH+/− and HPD. Additionally, the second connector 570 is configured to send galvanically-isolated power signals (+5V_ISO and GND_ISO) to the second device.

For providing galvanic isolation for the high-speed data-related electronic circuits in the first and second devices (among other reasons), the second connector 570 includes an optical-to-electrical converter comprising a set of photo detectors (PDs) 572-0 to 572-3, and a set of transimpedance amplifiers (TIAs) 574-0 to 574-3. The set of photo detectors (PDs) 572-0 to 572-3 receive the optical data signals from the first connector 510 via the optical fibers 520-0 to 520-3, respectively. The photo detectors (PDs) 572-0 to 572-3 convert the optical data signals into corresponding electrical current data signals. The set of TIAs 574-0 to 574-3 convert the electrical current data signals into electrical voltage data signals, which may be the high-speed electrical data signals ML_LANE 0+/0− to ML_LANE 3+/3−. The second connector 570 provides the high-speed electrical data signals ML_LANE 0+/0− to ML_LANE 3+/3− to the second device. It shall be understood that the second connector 570 may include a corresponding demultiplexer to reduce the number of optical fibers, as previously discussed.

As the transmission of the high-speed data signals between the first and second devices occurs in the optical domain along the communication cable 500, galvanic isolation between the high-speed data-related circuits in the first and second devices is achieved.

With regard to low-speed control signals (AUX CH+/CH− and HPD), the second connector 570 includes data-by-wire galvanic isolation devices 576, 578, and 580. Each of the galvanic isolation devices 576, 578, and 580 may be configured as an optocoupler or opto-isolator, DC blocking capacitor, magnetic flux isolation transformer, or Hall effect sensor. The galvanic isolation devices 576, 578, and 580 receive the AUX CH+/− and HPD via the wired mediums 530, 532, and 534 or from the second device, and provides the galvanically-isolated AUX CH+/− and HPD signals to the second device or to the first device via the wired mediums 530, 532, and 534. The wired mediums 530, 532, and 534 are part of the set of communication mediums 590.

Thus, through the use of the galvanic isolation devices 576, 578, and 580, galvanic isolation between the low-speed control data signal related circuits in the first and second devices is achieved. Although, in this example, the galvanic isolation devices 576, 578, and 580 are situated in the second converter 570, it shall be understood that the galvanic isolation devices 576, 578, and 580 may be situated within the first connector 510 or elsewhere along the communication cable 500. It shall be further understood that the galvanic isolation devices 576, 578, and 580 need not be co-located within the same housing of the communication cable 500.

With regard to the power signal, the first connector 510 is configured to receive the power signal (DP_PWR/RETURN) from the first device. As indicated by the arrows, the power signal (DP_PWR/RETURN) provides power to the electrical circuits/devices within the first connector 510, such as, for example, the LDDs 512-0 to 512-3. The power signals DP_PWR and RETURN are coupled to wire mediums 540 and 542 of the set of communication mediums 590 for transmission from the first connector 510 to the second connector 570, respectively. The second connector 570 includes a DC-to-DC converter 582 configured to receive the power signals DP_PWR and RETURN via the wired mediums 540 and 542, and generate galvanically-isolated power signals DP_PWR_ISO and RETURN_ISO, respectively. As indicated by the arrows, the galvanically-isolated power signal DP_PWR_ISO/GND_ISO provides power to the electrical circuits/devices within the second connector 570, such as, for example, the TIAs 574-0 to 574-3. The second connector 570 provides the galvanically-isolated power signals DP_PWR_ISO and RETURN_ISO to the second device.

Thus, through the use of the DC-to-DC converter 582, galvanic isolation between the power-signal related circuits in the first and second devices is achieved. Although, in this example, the DC-to-DC converter 582 is situated in the second converter 570, it shall be understood that the DC-to-DC converter 582 may be situated within the first connector 510 or elsewhere along the communication cable 500.

Figure 5B:
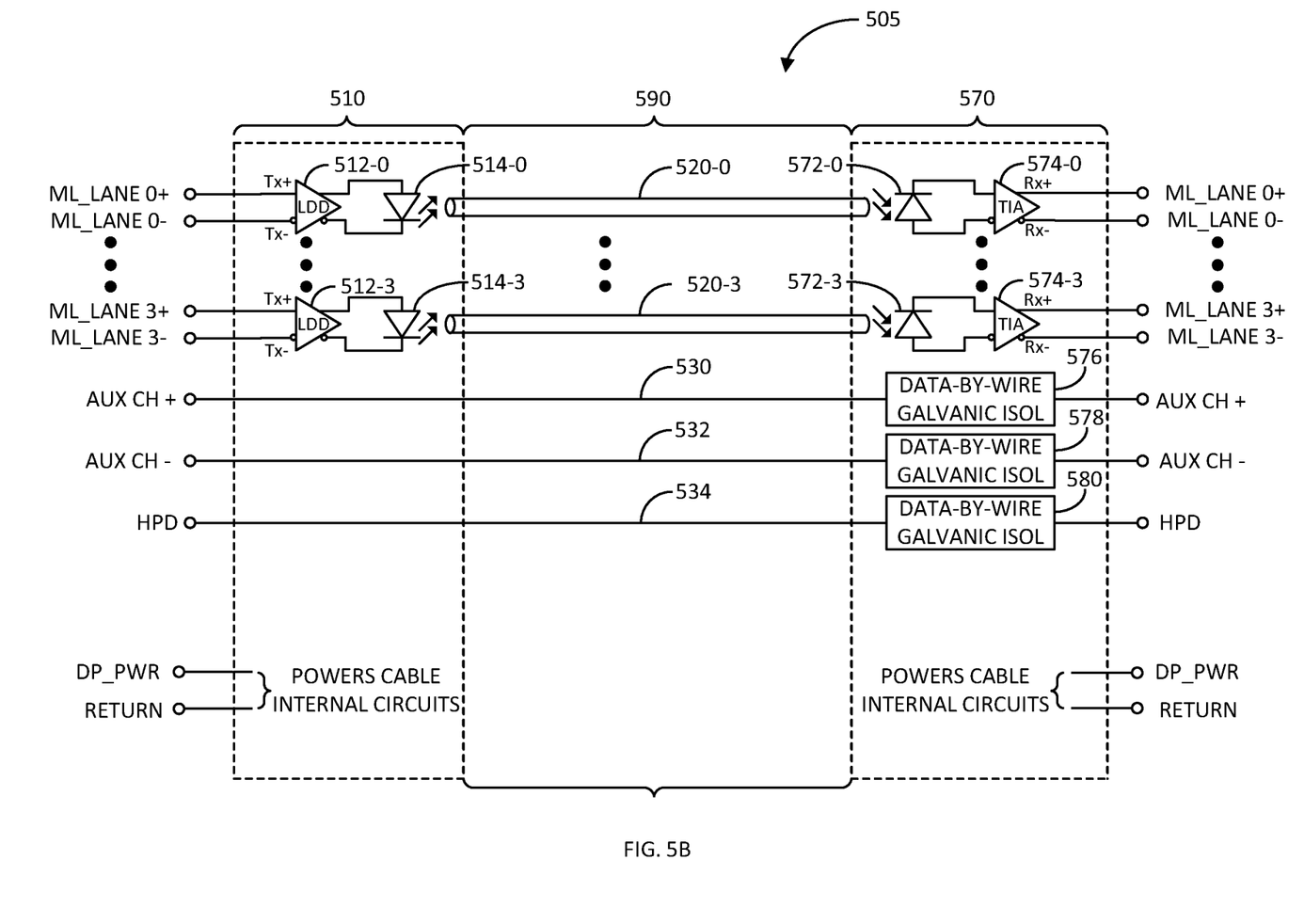
FIG. 5B illustrates a block/schematic diagram of another exemplary data and power communication cable with galvanic isolation protection in accordance with another aspect of the disclosure.

FIG. 5B illustrates a block/schematic diagram of another exemplary data and power communication cable 505 with galvanic isolation protection in accordance with another aspect of the disclosure. The communication cable 505 is a variation of the communication cable 500 previously discussed, and includes many of the same elements as indicated by the same reference numbers, respectively. The communication cable 505 differs from communication cable 500 in that the cable receives power from both the high-speed data source and the high-speed data sink.

In this regard, the power signals DP_PWR and RETURN need not be communicated from the first connector 510 to the second connector 570 or vice-versa. As indicated, the power signals DP_PWR and RETURN received by the first connector 510 from the first device provides power to the circuits internal to the first connector 510, such as the LDDs 512-0 to 512-3. Similarly, the power signals DP_PWR and RETURN received by the second connector 570 from the second device provides power to the circuits internal to the second connector 570, such as the TIAs 574-0 to 574-3.

Figure 6:
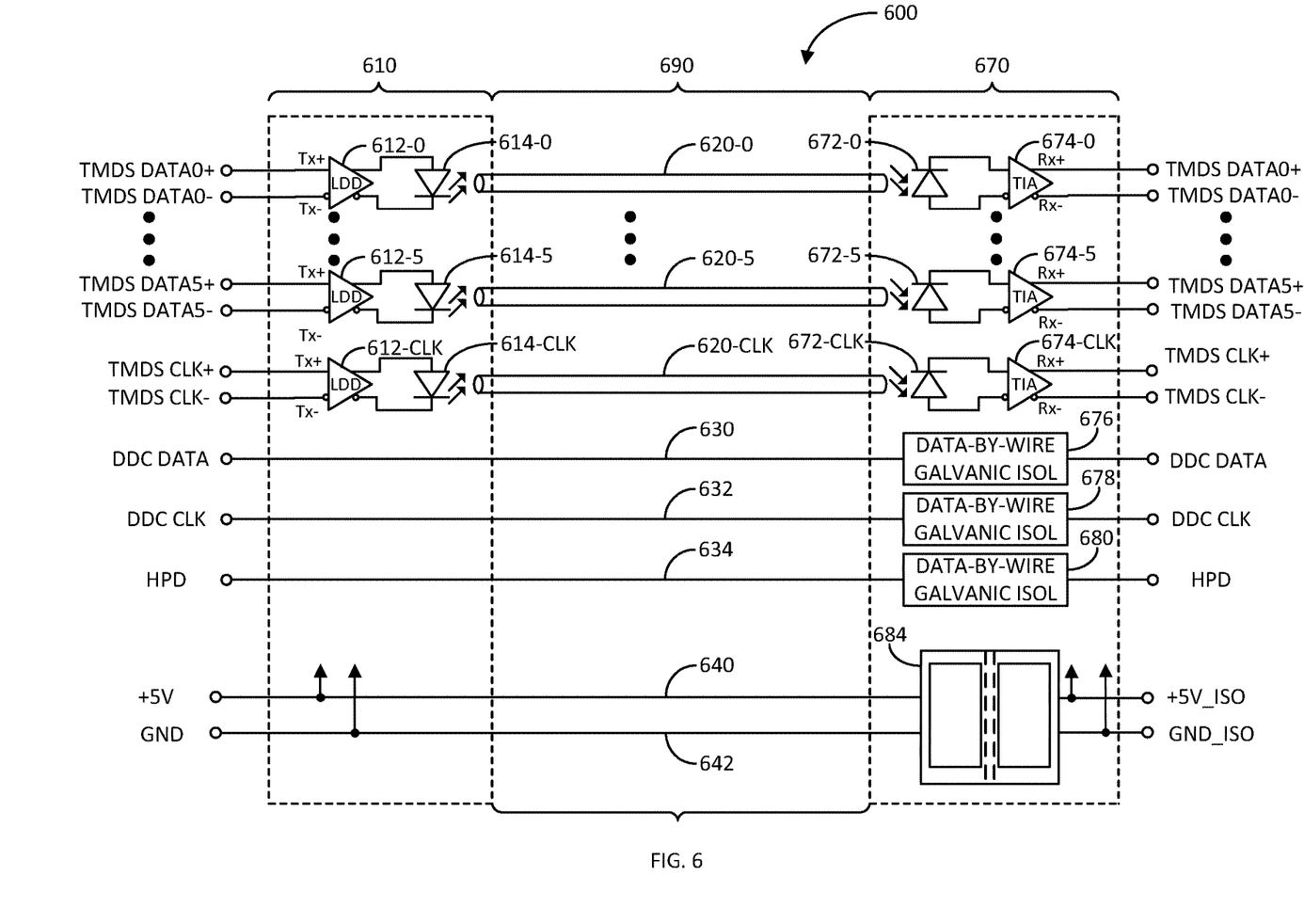
FIG. 6 illustrates a block/schematic diagram of another exemplary data and power communication cable with galvanic isolation protection in accordance with another aspect of the disclosure.

FIG. 6 illustrates a block/schematic diagram of another exemplary data and power communication cable 600 with galvanic isolation protection in accordance with another aspect of the disclosure. The data and power communication cable 600 may be an exemplary more detailed implementation of the data and power communication cable 200 previously discussed. As an example, the data and power communication cable 600 may be configured as a DVI-compliant cable with galvanic isolation protection for the data-side and power-side of the cable.

The data and power communication cable 600 includes a first connector 610, a second connector 670, and a set of communication mediums 690 with opposite ends mechanically coupled to the first and second connectors 610 and 670, respectively. The first connector 610 is configured to mate with a connector of a first device (not shown). In this example, the first connector 610 of the DVI-compliant communication cable 600 is configured to mate with the source of high-speed (multimedia) data signal (i.e., the first device). In this regard, the first connector 610 is configured to receive transmission-minimized differential signaling (TDMS) Data 0+/0− to TDMS Data 5+/5− and TDMS CLK+/CLK− from first device.

The first connector 610 is also configured to send and receive low-speed control data signals to and from the first device. For DVI-application, these control data signals include the DDC DATA, DDC CLK, and HPD. Additionally, the first connector 610 is configured to receive power signals (+5V and GND) from the first device.

For providing galvanic isolation for the high-speed data-related electronic circuits in the first and second devices (among other reasons), the first connector 610 includes an electrical-to-optical converter comprising a set of laser diode drivers (LDDs) 612-0 to 612-5 and 612-CLK, and a set of vertical cavity surface emitting lasers (VCSELs) 614-0 to 614-5 and 614-CLK. The LDDs 612-0 to 612-5 and 612-CLK boost the electrical TDMS data signals 0+/0− to 5+/5− and CLK+/CLK− with sufficient power to drive the set of VCSELs 614-0 to 614-5 and 614-CLK, respectively. The set of VCSELs 614-0 to 614-5 and 614-CLK generates optical data signals based on the drive signals from the LDDs 612-0 to 612-5 and 612-CLK, respectively. The optical data signals are transmitted from the first connector 610 to the second connector 670 via a set of optical fibers 620-0 to 620-5 and 620-CLK as part of the set of communication mediums 690. It shall be understood that the first connector 610 may include a multiplexer to reduce the number of optical fibers to one or more.

The second connector 670 is configured to mate with a connector of a second device (not shown). In this example, the second connector 670 of the DVI-compliant communication cable 600 is configured to mate with the sink of the high-speed (multimedia) data signal (i.e., the second device). In this regard, the second connector 670 is configured to provide the transmission-minimized differential signaling (TDMS) Data 0+/0− to TDMS Data 5+/5− and TDMS CLK+/CLK− to the second device.

The second connector 670 is also configured to send and receive the low-speed control data signals to and from the second device. As discussed, for DVI-application, these control data signals include the DDC DATA, DDC CLK and HPD. Additionally, the second connector 670 is configured to provide galvanically-isolated power signals (+5V_ISO and GND_ISO) to the second device and/or circuits internal to the communication cable 600.

For providing galvanic isolation for the high-speed data-related electronic circuits in the first and second devices (among other reasons), the second connector 670 includes an optical-to-electrical converter comprising a set of photo detectors (PDs) 672-0 to 672-5 and 672-CLK, and a set of transimpedance amplifiers (TIAs) 674-0 to 674-5 and 674-CLK. The set of photo detectors (PDs) 672-0 to 672-5 and 672-CLK receive the optical data signals from the first connector 610 via the optical fibers 620-0 to 620-5 and 620-CLK, respectively. The photo detectors (PDs) 672-0 to 672-5 and 672-CLK convert the optical data signals into corresponding electrical current data signals. The set of TIAs 674-0 to 674-5 and 674-CLK convert the electrical current data signals into electrical voltage data signals, which may be the transmission-minimized differential signaling (TDMS) Data 0+/0− to TDMS Data 5+/5− and TDMS CLK+/CLK−. The second connector 670 provides the transmission-minimized differential signaling (TDMS) Data 0+/0− to TDMS Data 5+/5− and TDMS CLK+/CLK− to the second device. It shall be understood that the second connector 670 may include a corresponding demultiplexer to reduce the number of optical fibers, as previously discussed.

As the transmission of the TDMS data signals between the first and second devices occurs in the optical domain along the communication cable 600, galvanic isolation between the high-speed data-related circuits in the first and second devices is achieved.

With regard to low-speed control signals (DDC DATA, DDC CLK, and HPD), the second connector 670 includes data-by-wire galvanic isolation devices 676, 678, and 680. Each of the galvanic isolation devices 676, 678, and 680 may be configured as an optocoupler or opto-isolator, DC blocking capacitor, magnetic flux isolation transformer, or Hall effect sensor. The galvanic isolation devices 676, 678, and 680 receive the DDC DATA, DDC CLK, and HPD via the wired mediums 630, 632, and 634 or from the second device, and provides the galvanically-isolated DDC DATA, DDC CLK, and HPD signals to the second device or to the first device via the wired mediums 630, 632, and 634, respectively. The wired mediums 630, 632, and 634 are part of the set of communication mediums 690.

Thus, through the use of the galvanic isolation devices 676, 678, and 680, galvanic isolation between the low-speed control data signal related circuits in the first and second devices is achieved. Although, in this example, the galvanic isolation devices 676, 678, and 680 are situated in the second converter 670, it shall be understood that the galvanic isolation devices 676, 678, and 680 may be situated within the first connector 610 or elsewhere along the communication cable 600. It shall be further understood that the galvanic isolation devices 676, 678, and 680 need not be co-located within the same housing of the communication cable 600.

With regard to power signal, the first connector 610 is configured to receive the power signal (+5V/GND) from the first device. As indicated by the arrows, the power signal +5V/GND provides power to the electrical circuits/devices within the first connector 610, such as, for example, the LDDs 612-0 to 612-5 and 612-CLK. The power signals +5V and GND are coupled to wire mediums 640 and 642 of the set of communication mediums 690 for transmission from the first connector 610 to the second connector 670, respectively. The second connector 670 includes a DC-to-DC converter 684 configured to receive the power signals +5V and GND via the wired mediums 640 and 642, and generate galvanically-isolated power signals +5V_ISO and GND_ISO, respectively. As indicated by the arrows, the galvanically-isolated power signal +5V_ISO/GND_ISO provides power to the electrical circuits/devices within the second connector 670, such as, for example, the TIAs 674-0 to 674-5 and 674-CLK. The second connector 670 provides the galvanically-isolated power signals +5V_ISO and GND_ISO to the second device.

Thus, through the use of the DC-to-DC converter 684, galvanic isolation between the power-signal related circuits in the first and second devices is achieved. Although, in this example, the DC-to-DC converter 684 is situated in the second converter 670, it shall be understood that the DC-to-DC converter 684 may be situated within the first connector 610 or elsewhere along the communication cable 600.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A data and power communication cable, comprising:
    a first connector configured to mate with a corresponding connector of a first device, wherein the first connector is configured to receive a data signal and a power signal from the first device;
    a first galvanic-isolating device configured to generate a galvanic-isolated data signal based on the data signal;
    a second galvanic-isolating device configured to generate a galvanic-isolated power signal based on the power signal, wherein the second galvanic-isolating device comprises a charge pump configured to charge a shunt capacitor based on the power signal to generate the galvanic-isolated power signal;
    a second connector configured to mate with a corresponding connector of a second device, wherein the second connector is configured to provide the galvanic-isolated data signal and the galvanic-isolated power signal to the second device;
    a first set of one or more communication mediums configured to route the data signal or the galvanic-isolated data signal from the first connector to the second connector; and
    a second set of one or more communication mediums configured to route the power signal or the galvanic-isolated power signal from the first connector to the second connector.

2. The data and power communication cable of claim 1, wherein the first galvanic-isolating device comprises:
    an electrical-to-optical converter configured to convert the data signal from electrical domain to optical domain; and
    an optical-to-electrical converter configured to convert the data signal from the optical domain to the electrical domain.

3. The data and power communication cable of claim 2, wherein the electrical-to-optical converter comprises:
    a laser diode driver (LDD) configured to generate a drive signal based on the data signal in the electrical domain; and
    a vertical cavity surface emitting laser (VCSEL) configured to generate the data signal in the optical domain based on the drive signal.

4. The data and power communication cable of claim 2, wherein the optical-to-electrical converter comprises:
    a photo detector (PD) configured to generate an electrical current data signal based on the data signal in the optical domain; and
    a transimpedance amplifier (TIA) configured to generate the galvanic-isolated data signal based on the electrical current data signal.

5. The data and power communication cable of claim 2, wherein the electrical-to-optical converter is situated within the first connector, wherein the optical-to-electrical converter is situated within the second connector, and wherein the first set of one or more communication mediums comprises one or more optical fibers.

6. The data and power communication cable of claim 2, wherein the electrical-to-optical converter and/or the optical-to-electrical converter is situated within one or more housings situated between the first and second connectors.

7. The data and power communication cable of claim 1, wherein the first galvanic-isolating device comprises an optocoupler, an opto-isolator, a DC blocking capacitor, a magnetic flux isolation transformer, or a Hall effect sensor.

8. The data and power communication cable of claim 1, wherein the first galvanic-isolating device is situated within the first connector, wherein the first set of one or more communication mediums comprises one or more wires, and wherein the one or more wires are configured to route the galvanic-isolated data signal from the first connector to the second connector.

9. The data and power communication cable of claim 1, wherein the first galvanic-isolating device is situated within the second connector, wherein the first set of one or more communication mediums comprises one or more wires, and wherein the first galvanic-isolating device is configured to receive the data signal from the first connector via the one or more wires.

10. The data and power communication cable of claim 1, wherein the first galvanic-isolating device is situated within one or more housings situated between the first and second connectors.

11. The data and power communication cable of claim 1, wherein the second galvanic-isolating device comprises a DC-to-DC converter.

12. The data and power communication cable of claim 11, wherein the DC-to-DC converter comprises a transformer-type DC-to-DC converter.

13. The data and power communication cable of claim 11, wherein the DC-to-DC converter comprises a capacitive-type DC-to-DC converter.

14. The data and power communication cable of claim 1, wherein the second galvanic-isolating device is situated within the first connector, wherein the second set of one or more communication mediums comprises one or more wires, and wherein the one or more wires are configured to route the galvanic-isolated power signal from the first connector to the second connector.

15. The data and power communication cable of claim 1, wherein the second galvanic-isolating device is situated within the second connector, wherein the second set of one or more communication mediums comprises one or more wires, and wherein the second galvanic-isolating device is configured to receive the power signal via the one or more wires.

16. The data and power communication cable of claim 1, wherein the second galvanic-isolating device is situated within one or more housings situated between the first and second connectors.

17. The data and power communication cable of claim 1, wherein the first galvanic-isolating device is configured to receive the galvanic-isolated power signal.

18. A data and power communication cable, comprising:
a first connector configured to mate with a corresponding connector of a first device, wherein the first connector is configured to receive a data signal and a first power signal from the first device;
a first galvanic-isolating device configured to generate a galvanic-isolated data signal based on the data signal;
a second galvanic-isolating device comprising a charge pump configured to charge a shunt capacitor based on the first power signal to generate a galvanic-isolated power signal;
a second connector configured to mate with a corresponding connector of a second device, wherein the second connector is configured to provide the galvanic-isolated data signal to the second device and receive a second power signal from the second device;
and a set of one or more communication mediums configured to route the data signal or the galvanic-isolated data signal from the first connector to the second connector.

19. The data and power communication cable of claim 18, wherein the first galvanic-isolating device comprises:
an electrical-to-optical converter configured to convert the data signal from electrical domain to optical domain; and
an optical-to-electrical converter configured to convert the data signal from the optical domain to the electrical domain.

20. The data and power communication cable of claim 18, wherein the first galvanic-isolating device comprises an optocoupler, an opto-isolator, a DC blocking capacitor, a magnetic flux isolation transformer, or a Hall effect sensor.

21. A data and power communication cable, comprising:
a first connector configured to mate with a corresponding connector of a first device, wherein the first connector is configured to receive a data signal and a power signal from the first device;
a galvanic-isolating device configured to generate a galvanic-isolated power signal based on the power signal, wherein the galvanic-isolating device comprises a charge pump configured to charge a shunt capacitor based on the power signal to generate the galvanic-isolated power signal;
a second connector configured to mate with a corresponding connector of a second device, wherein the second connector is configured to provide the data signal and the galvanic-isolated power signal to the second device;
a first set of one or more communication mediums configured to route the data signal from the first connector to the second connector; and
a second set of one or more communication mediums configured to route the power signal or the galvanic-isolated power signal from the first connector to the second connector.

* * * * *